(12) United States Patent
Chaudhuri et al.

(10) Patent No.: US 7,228,312 B2
(45) Date of Patent: Jun. 5, 2007

(54) TRANSFORMATION TOOL FOR MAPPING XML TO RELATIONAL DATABASE

(75) Inventors: Surajit Chaudhuri, Redmond, WA (US); Zhiyuan Chen, Bellevue, WA (US); Kyuseok Shim, Seoul (KR); Yuqing Yu, Ann Arbor, MI (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 10/796,435

(22) Filed: Mar. 9, 2004

(65) Prior Publication Data

US 2005/0203933 A1 Sep. 15, 2005

(51) Int. Cl.
*G06F 17/00* (2006.01)
*G06F 17/30* (2006.01)

(52) U.S. Cl. ............................. 707/102; 707/103 Y
(58) Field of Classification Search ............... 707/1, 707/100, 101, 102
See application file for complete search history.

(56) References Cited

U.S. PATENT DOCUMENTS

2005/0050068 A1* 3/2005 Vaschillo et al. ............ 707/100
2005/0187973 A1* 8/2005 Brychell et al. ........... 707/104.1

OTHER PUBLICATIONS

S. Agrawal, S. Chaudhuri, and V. R. Narasayya. *Automated Selection of Materialized Views and Indexes for SQL Databases*, In VLDB, 2000.
S. Banerjee, V. Krishnamurthy, M. Krishnaprasad, and R. Murthy. *Oracle8i—The XML Enabled Data Management System*. In ICDE, 2000.
P. Bohannon, J. Freire, P. Roy, and J. Simeon. *From XML Schema to Relations: A Cost-Based Approach to XML Storage*. In ICDE, 2002.
N. Bruno, N. Koudas, and D. Srivastava. *Holistic Twig Joins: Optimal XML Pattern Matching*. In SIGMOD, 2002.
S. Chaudhuri and V. R. Narasayya. *An Efficient, Cost-Driven Index Selection Tool for Microsoft SQL Server*. In VLDB, 1997.
J. M. Cheng and J. Xu. *XML and DB2*. In ICDE, 1999.
V. Christophides, S. Abiteboul, S. Cluet, and M. Scholl. *From Structured Documents to Novel Query Facilities*. In SIGMOD, 1994.
A. Deutsch, M. F. Fernandez, and D. Suciu. *Storing Semistructured Data wit STORED*. In SIGMOD, 1999.
M. F. Fernandez, A. Morishima, and D. Suciu. *Efficient Evaluation of XML Middle-ware Queries*. In SIGMOD, 2001.
D. Florescu and D. Kossmann. *Storing and Querying XML Data using an RDBMS*. IEEE Data Engineering Bulletin, 1999.

(Continued)

*Primary Examiner*—Alford W. Kindred

(57) ABSTRACT

An XML transformation tool that constructs a relational database with associated physical structures that can be populated with shredded XML data. A mapping transformation enumerator examines queries in the workload and enumerates mapping transformations that use XSD specific constraints and statistics on XML data and can be used to generate mappings from XSD to relational database schema that may lead to better performance in presence of physical design. A design tuner that searches mappings generated from a default mapping using enumerated transformations together with physical design structures associated with those mappings and selects a preferred mapping and the physical design structures. Cost estimates for performing queries in the workload are determined for the relational database implementing the mapping and associated physical design structures.

37 Claims, 4 Drawing Sheets

OTHER PUBLICATIONS

M. Klettke and H. Meyer. *XML and Object-Relational Database Systems—Enhancing Structural Mappings Based on Statistics*. In WebDB, 2000.

R. Krishnamurthy, V. T. Chakaravarthy, and J. F. Naughton. *On the Difficulty of Finding Optimal Relational Decompositions for XML Workloads: A Complexity Theoretic Perspective*. In IGDT, 2003.

A. Schmidt, M. L. Kersten, M. Windhouwer, and F. Waas. *Efficient Relational Storage and Retrieval of XML Documents*. In WebDB, 2000.

J. Shanmngasundaram, G. He, K. Tufte, C. Zhang, D. DeWitt, and J. Naughton. *Relational Databases for Querying XML Documents: Limitations and Opportunities*. In VLDB, 1999.

J. Shanmugasundaram, E. J. Shekita, R. Barr, M. J. Carey; B. G. Lindsay, H. Pirahesh, and B. Reinwald. *Efficiently Publishing Relational Data as XML Documents*. In VLDB, 2000.

T. Shimura, M. Yoshikawa, and S. Uemnra. *Storage and Retrieval of XML Documents using Object-Relational Databases*. In DEXA, 1999.

G. Valentin, M. Zuliani, D. C. Zilio, G. M. Lohman, and A. Skelley. *DB2 Advisor: An Optimizer Smart Enough to Recommend Its Own Indexes*. In ICDE, 2000.

H. Wang, S. Park, W. Fan, and P. S. Yu. *ViST: A Dynamic Index Method for Querying XML Data by Tree Structures*. In SIGMOD, 2003.

\* cited by examiner

TRANSFORMATION TOOL FOR MAPPING XML TO RELATIONAL DATABASE

TECHNICAL FIELD

The invention relates generally to the field of XML data processing and more specifically to a transformation tool for mapping XML data into a relational database to support queries on the data.

BACKGROUND OF THE INVENTION

XML is becoming the standard for exchanging and querying information over the web. Furthermore, much of business XML data increasingly relies on accompanying XSD schema specifications to ensure meaningful exchange of information. Languages such as XPath and XQuery have been proposed for querying XML data. One approach toward supporting XPath over such XML data is that of building a native XML repository upon which XPath queries can be executed. Alternatively, XML data can be "shredded" (with its associated XSD specification) into a relational database. The relational database alternative is attractive because it can take full advantage of mature relational database technology. Shredding XML data has in the past been addressed by focusing on the logical design step in constructing the database repository (i.e., the mapping from XSD schema to relational database schema). However, past work has ignored the role that physical database design should play in selecting the logical design for the database. This separation between the process of selecting a logical design for the database and a physical design for the database can lead to suboptimal performance when the queries are executed on the resulting database.

Most major commercial relational database systems provide a default way to map XML documents to relational storage and allow the user to specify his own mappings, which is often quite tedious given the complexity of the problem.

SUMMARY OF THE INVENTION

An XML transformation tool is provided that constructs a relational database for storing XML data that has an associated XSD schema and a workload consisting of queries executed on the XML data. A mapping transformation enumerator enumerates a set of candidate transformations based on queries in the workload, which define the logical design space to be considered by the tool. Since the number of all possible transformations is large, the enumerator enumerates transformations based on queries in the workload. Such transformations are added to a candidate pool. A design tuner searches logical design along with physical design and selects a preferred mapping (i.e., logical design) along with the physical design structures in the mapped relational database. The physical design structures can be selected based on statistics about the XML data. The XSD schema can be first mapped to a relational database schema using a default mapping protocol such as hybrid inlining and candidate transformations then correspond to transformations of the default mapping.

Candidate transformations in the candidate pool may be merged to form a merged candidate transformation for consideration by the design tuner.

The design tuner then enumerates mappings generated from the default mapping by applying a sequence of transformations in the candidate pool. For each such generated mapping, a physical database design tool selects the physical design structures under that mapping such that the performance of SQL queries translated from workload is optimized. The physical design tool also returns an estimate of the cost of executing SQL queries translated from the workload in a relational database which implements the mapping and associated physical design structures. The design tuner then selects the mapping and physical design structures with the lowest cost. The estimated cost sometimes can be derived from a known cost for another mapping.

DETAILED DESCRIPTION OF A PREFERRED EMBODIMENT

Figure 1:
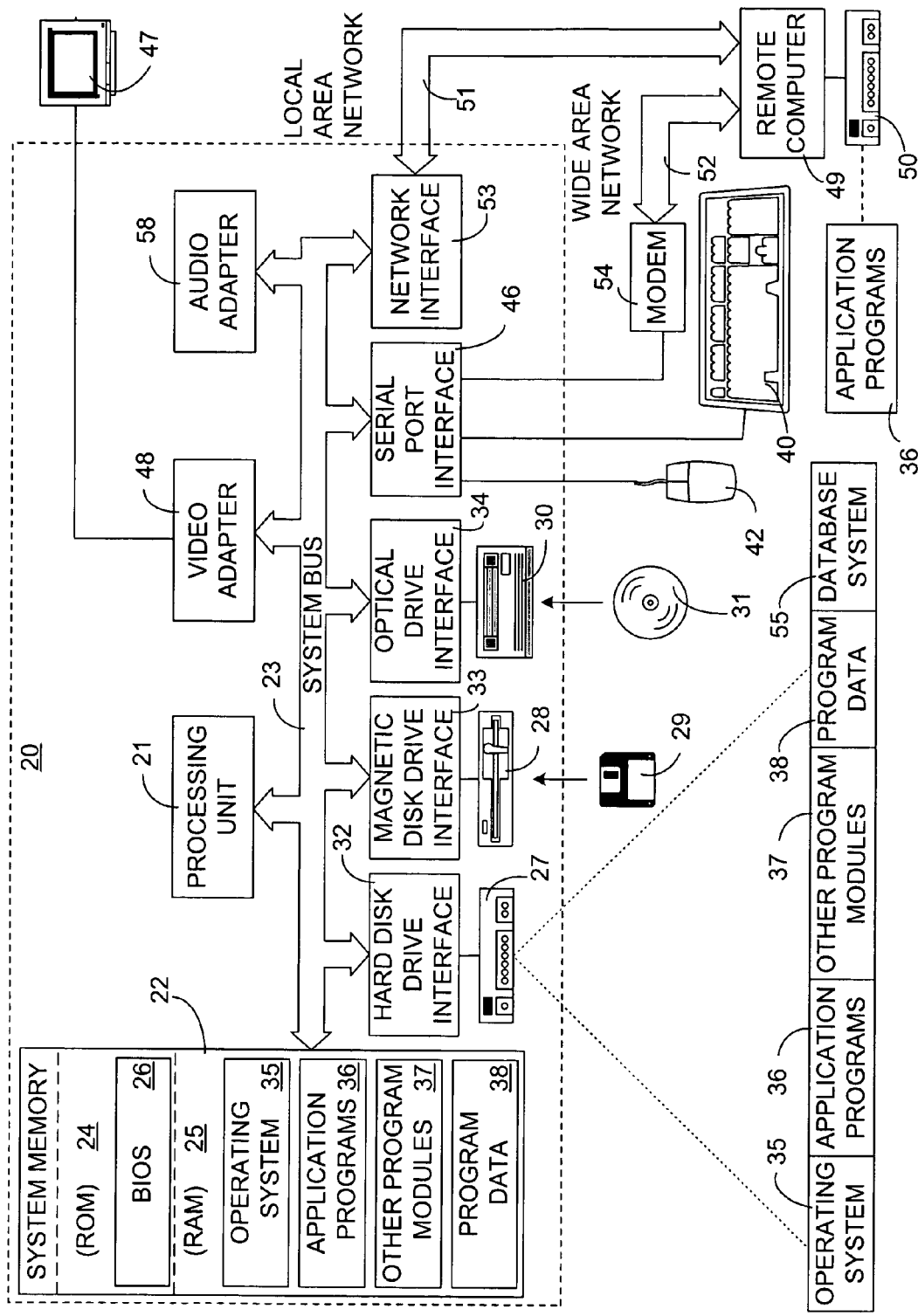
FIG. 1 illustrates an exemplary operating environment for implementing an XML transformation tool according to one embodiment of the present invention.

The following description will refer to a specifically SQL Server implementation of the invention, however it will be appreciated that the invention can be practiced in conjunction with any relational database system.

The following example shows the impact that the selection of physical design structures has on the efficiency with which various logical designs can return results to queries on the relation. As will be described below, choosing a mapping technique without considering physical design structures can lead to selection of a mapping that is not optimal once physical design structures are added.

In the DBLP database that contains records about publications, each publication has the following elements: book-title, title, year, several authors, and pages. Using a hybrid-inlining mapping that has been proposed in previous work, publications in proceedings are mapped to the following relations:

Mapping 1
   inproc(ID, title,booktitle,year,pages)
   inproc_author(ID, PID, author)

An XPath query that returns the title, year, and author of SIGMOD papers can be translated to the following SQL statement using a sorted-outer union approach that has been proposed in previous work:
   SELECT I.ID, title, year, NULL,
   FROM inproc I
   WHERE booktitle='SIGMOD CONFERENCE'
   UNION ALL
   SELECT I.ID, NULL, NULL, author
   FROM inproc I, inproc_author A
   WHERE booktitle='SIGMOD CONFERENCE'
   AND I.ID=A.PID
   ORDER BY I.ID Since most publications have a small number of authors, the following relational mapping could be considered where the first 5 authors are stored in the inproc relation, and the remaining authors are stored in the inproc_author relation.

Mapping 2
   inproc(ID, title, booktitle, year, author_1, . . . , author_5, pages)
   inproc_author(ID, PID, author)

With this mapping the SQL query becomes:
   SELECT I.ID, title, year, author_1, . . . , author_5, null
   FROM inproc I
   WHERE booktitle='SIGMOD CONFERENCE'
   UNION ALL
   SELECT I.ID, null, null, null, . . . , null, author
   FROM inproc I, inproc_author A
   WHERE booktitle='SIGMOD CONFERENCE'
   AND I.ID=A.PID
   ORDER BY I.ID When both queries were run on Microsoft SQL Server 2000® with the indexes and materialized views that were recommended by the Index Tuning Wizard® of SQL Server, the execution time using Mapping 2 was 0.25 second as compared to 5.1 seconds for Mapping 1. This is because under Mapping 2, the inproc_author relation is almost empty since most publications have no more than 5 authors, so an index-nested loop join is used to join inproc and inproc_author. This makes the Mapping 2 join cost much lower than the join cost under Mapping 1 where a hash join is used. Even though the inproc relation in Mapping 2 is larger than inproc in Mapping 1, because a covering index (that covers all the attributes of a table that are referenced in a query such that the query can be evaluated from the index only) is recommended, the cost to retrieve title and year (the SQL before UNION ALL) is about the same under both mappings.

In contrast, if no indexes or materialized views are present, the execution of the query took 27 seconds with Mapping 2 compared to 21 seconds for Mapping 1. This is because hash join was used under both mappings and it was more expensive to scan inproc under Mapping 2. Thus if the mapping in this case selected without considering the physical design, Mapping 1 would have been wrongly selected, leading to 20 times worse performance once the physical design structures were in place.

This example also shows that the outlining mapping proposed in previous work is of little use in light of available physical design structures. An outlining mapping splits the inproc relation in Mapping 1 into two partitions, one consisting of columns referred in the query, the other consisting of the other columns achieves the same effect as a covering index under Mapping 1, and thus is in fact subsumed completely by traditional physical database design alternatives. Therefore logical design alternatives that utilize an outlining mapping technique do not need to be considered in light of available physical design alternatives.

The described transformation tool utilizes the fact that certain logical design mapping techniques do not need to be included in the space of logical design alternatives considered when physical design structures are included in the evaluation of candidate relations.

Schema, Workload, and Mapping Overview

For the purposes of this description it is assumed that the XML data has an XSD schema. For illustration purposes the schema is represented using a tree T(V,E), where nodes V represent elements and attributes, and edges E represent a parent-child relationship. The XML data are instances of the tree. The leaves store values of attributes or elements. A special "choice" node indicates that only one of its children can appear in an instance. A set-valued element has its incoming edge marked with '*', and an optional node (with zero or one occurrence) has its incoming edge marked with '?'. A set-valued element can also have maxOccurs that specifies its maximal cardinality.

Figure 2:
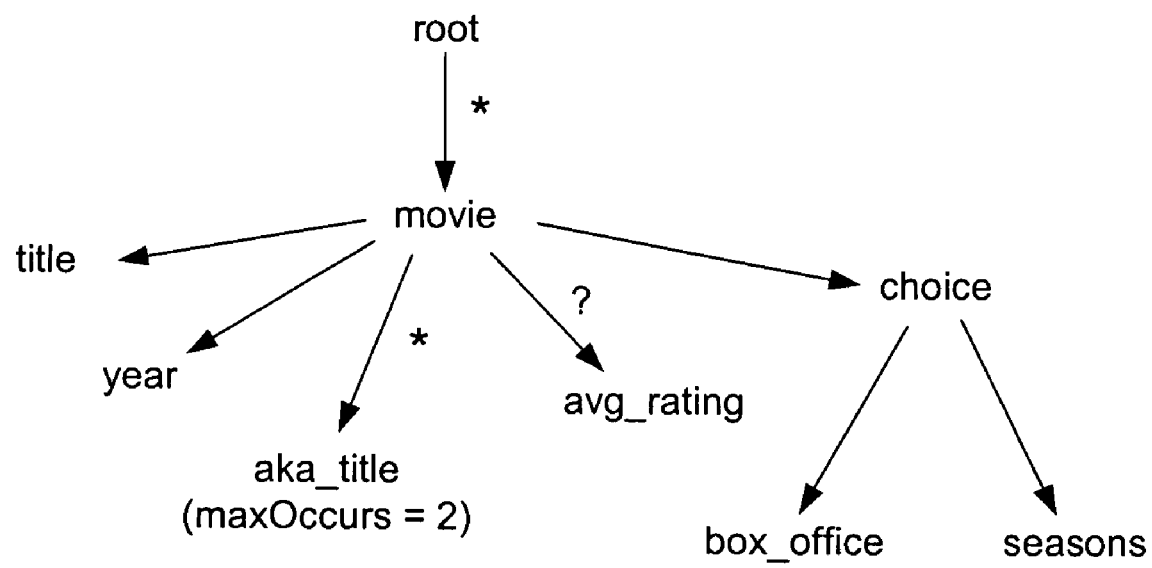
FIG. 2 is an XSD schema tree that is used throughout the description in conjunction with examples.

FIG. 2 shows an example schema where there are a number of movie elements, each of which has a title, year, at most two aka_titles and an optional avg_rating. A movie element can either have box_office or seasons, but not both. For the purposes of this description an extension of the XPath query language is used. The XPath query: movie[title=[Titanic"] {/aka_title}{/avg_rating} returns the average rating and aka_title of the movie with title "Titanic". [title="Titanic"] identifies the selection condition and is called a selection path. The original XPath query is extended with { } notation that indicates the element(s) being returned (in standard XPath, the last element in the query path is returned), and allows multiple elements to be returned. In standard XPath, the returned element must appear in data. In this extended version, at least one of the returned elements must appear in data because if none of the elements exist, then no results are returned. The elements specified in { } are called "projection elements". For example, the above query returns both aka_title and avg_rating, and the results are identical to the union of results of the following two queries: //movie[title="Titanic"]/aka_title and //movie [title="Titanic"]/avg_rating.

Other concepts that are used in this description include an XPath workload and the concept of mapping XML to a relation. An XPath workload W is a set of ($Q_i$, $f_i$), where $Q_i$ is an XPath query, and $f_i$ is the weight associated with $Q_i$. XML to relational mapping is defined as follows:

Definition 1 XML to relational mapping M is a mapping from XSD schema T(V,E) to R, where R is a set of relations. The mapping satisfies two conditions: 1) each leaf node v ∈ V is mapped to a column in R; and (2) if node u is v's parent, and u and v are mapped to two different relations $R_1$ and $R_2$ in R, then there is a foreign key constraint between $R_1$ and $R_2$. $R_1$ is called the parent relation of $R_2$.

The first condition in Definition 1 guarantees data values are stored and the second condition guarantees the tree structure is stored. The transformation tool described herein uses the hybrid inlining mapping as the default mapping. It is generated as follows: (1) create a relation for each node v in V with '*' or no incoming edge, and create an ID column as a primary key; (2) create a column for leaf u in the relation of v if u is a descendant of v and there is no '*' edge between u and v; (3) store parent relations' primary key in a PID column. The default mapping for the movie schema and the resulting relation is shown in FIG. 2.

XML Transformation Tool

Figure 3:
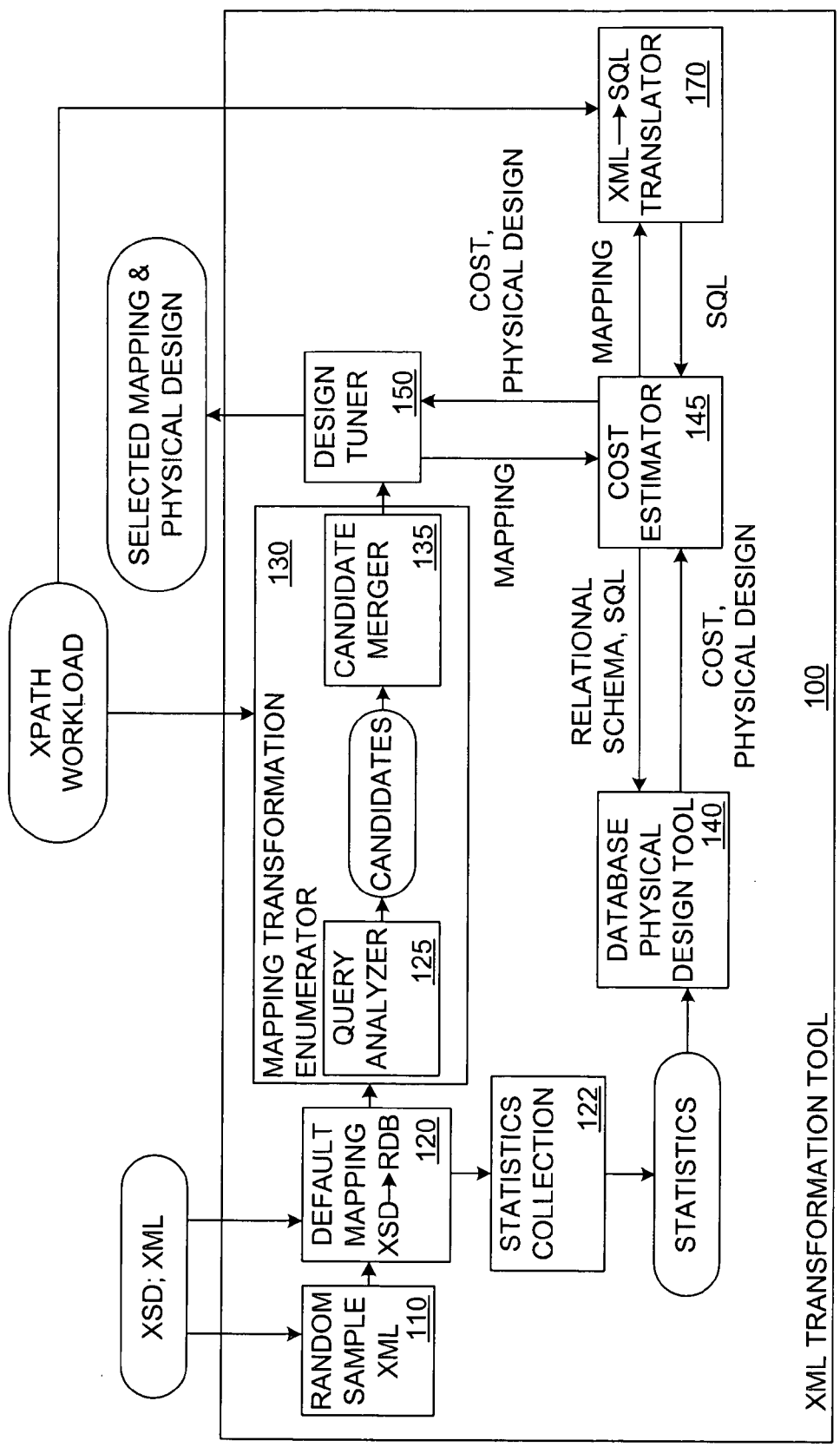
FIG. 3 is a functional block diagram of a transformation tool constructed in accordance with an embodiment of the present invention.

FIG. 3 is a functional block diagram for an XML transformation tool 100 to which is input an XSD schema and corresponding XML data and XPath workload. The XML transformation tool 100 outputs a selected relational database RDB into which the XML data can be shredded. The XML transformation tool explores a space of possible mappings in conjunction with a set of physical design structures to arrive at the selected relational database. Most typically, the XML transformation tool 100 are constructed in software executing on a computer system 20 (FIG. 1) such as a server computer. In a most typical example the user is logged onto his or her computer and communicates with a remote computer system acting as a server via a wide area network. A computer system 20 in conjunction with which the XML transformation tool can be utilized is depicted in FIG. 1 and described in greater detail below.

The space of logical design that are explored by the XML transformation tool 100 can be defined as the set of mappings that can be generated from the default mapping described above by applying a sequence of transformations. Possible mapping transformations that could be explored by the transformation tool 100 include the following transformations.

Outlining and inlining are well known mapping transformations. Given $v_1, \ldots, v_k$ as nodes that are mapped to columns in a relation R, outlining of the nodes splits R into two relations $R_1$ and $R_2$. $R_1$ consists of the ID column of R and the columns in R that are mapped from $v_1, \ldots, v_k$ or their descendants. $R_2$ stores the ID column and their remaining columns. For example the following relational schema is obtained by outlining title, year, and avg_rating:

movie1(ID, title, year, avg_rating)
movie2(ID, box_office, sesons)
aka_title(ID, PID, aka_title).

Inlining is the reverse of outlining. It is assumed that set-valued elements cannot be inlined because a relational model does not allow set-valued columns. The default mapping shown in FIG. 2 is a fully inlined mapping.

Outlining and inlining are similar to vertical partitioning in relational databases. Indeed, they are completely subsumed by vertical partitioning because an outlining of $v_1, \ldots, v_k$ is identical to a vertical partitioning that divides the columns in R into two partitions, one consisting of the ID column of R and the columns in R that are mapped from $v_1, \ldots, v_k$ or their descendants, and the other consisting of the ID column and the remaining columns.

Union distribution uses the choice node specification in XSD. Given a choice node v that has k children, $v_1, v_2 \ldots, v_k$ are mapped to relation R. Union distribution horizontally partitions R into relations $R_1, \ldots, R_k$, where each $R_i$ ($1 \leq i \leq k$) stores the columns mapped from $v_i$ or its descendants along with the remaining columns in R that are not mapped from descendants of v. For example the following shows the relational schema obtained by distributing the union of box_office and seasons.

movie1(ID, title, year, avg_rating, box_office)
movie2(ID, title, year, avg_rating, seasons)
aka_title(ID, PID, aka_title)

Movies with box_office are stored in movie1 and movies with seasons are stored in movie2. Union distribution is similar to horizontal partitioning in relational databases except that it intelligently drops the columns with all null values (e.g. movie1 drops the seasons column because a movie cannot have seasons if it has a box_office).

Implicit union distribution uses the optional specification in XSD. An optional node such as the avg_rating node can be seen as an implicit union, thus it can be partitioned similar to union distribution as follows:

movie1(ID, title, year, avg_rating, box_office, seaons)
movie2(ID, title, year, box_office, seasons)
aka_title(ID, PID, aka_title)

By applying the implicit union distribution on avg_rating, two relations are generated, one storing movies with avg_rating and the other relation storing those without.

Pull-up mapping uses the maxOccurs specification in XSD. If v is a set-valued element, and v is u's child with maxOccurs k, for each instance of u pull-up v stores the first k instances of v in the relation mapped from u. k is called the pull-up count. The following shows the relational schema obtained by pulling up two aka_titles.

movie(ID, title, year, avg_rating, box_office, seasons, aka_title_1, aka_title_2)
aka_title(ID, PID, aka_title)

The first two aka_titles of each movie are stored in the aka_title1 and aka_title2 columns in the movie relation. The ID and PID columns of the pulled up aka_title do not need to be stored. As shown by the above example in Mapping 2, pull-up reduces the cost of joining set-valued elements with the parent relation by storing the first k set-valued elements in the parent relation. Pull-up is similar to denormalization or a materialized view that joins the relations of u and v. However, pull-up does not repeat the columns in the parent relation.

The XML transformation tool 100 explores the space of mapping alternatives just described in conjunction with available physical design structures to select a logical design and a corresponding physical design for the relational database. This objective can be defined as follows.

Definition 2 Given an XSD schema T, an XPath workload W and a storage bound S, find a mapping M that maps T to a relational schema R, and a configuration F as a set of physical design structures on R whose storage requirement (including both data and physical design structures) does not exceed S, such that $$\sum_{Q \in W} f_Q \cdot \cos t(Q, R, F)$$

is minimized. Cost(Q,R,F) is the cost of running the SQL statements translated from Q on R with configuration F.

The XML transformation tool 100 starts by performing default mapping of the XSD structure to a relational database as shown in functional block 120. This is a practical starting point because it is independent of workload (which is not always known) and then the mapping transformation enumerator 130 enumerates transformations to modify the default mapping to improve query performance.

The XML transformation tool 100 explores a combined search space of logical and physical designs that is extremely large because its complexity equals the product of the complexity of logical design and physical design. Thus the mapping transformation enumerator 130 employs techniques to allow it to effectively prune the logical design space based on the relationship between physical and logical design as well as the XPath queries in the workload.

It has been discovered through experimentation that some well-know mapping transformations are redundant if the combined space of mappings and their physical design alternatives is considered. Specifically (1) outlining/inlining options are always subsumed by vertical partitioning and are subsumed by indexes in large space and infrequent update scenarios; and (2) union distribution, implicit union distribution, and pull-up do bring benefits over physical design. Therefore the XML transformation tool need only consider union distribution, implicit union distribution, and pull-up when searching the joint space of logical and physical design.

The transformations that are considered by the XML transformation tool are significant because they take advantage of the schema specifications in the XSD in conjunction with data characteristics that define complex constraints difficult to capture in relational databases. In particular, union distribution and implicit union distribution can be seen as horizontal partitioning that intelligently drops columns with all null values by leveraging the semantics of the choice and optional node specifications in XSD. An optional node in XSD specifies that its descendant nodes are either all null or not null. This corresponds to a complex constraint in relational database that specifies whether a set of columns (possibly from different tables) is null at the same time. This constraint is difficult for the user to specify in relational databases (although the user can easily specify whether a single column may have null values or not), and cannot be inferred from the relational schema mapped from the XSD schema. Similarly, a choice node in XSD specifies that if the descendant nodes of one its children are not null, the descendant nodes of all other children must be null. This also translates to complex constraints in relational databases that are difficult for the user to specify or to infer from the relational schema itself. Similarly, pull-up takes advantage of the maxOccurs specification in XSD, which is not specified in relational databases. Therefore the mapping transformation enumerator selects valid mapping transformations based on the XSD schema rather than the relational schema mapped from the XSD schema.

Figure 4:
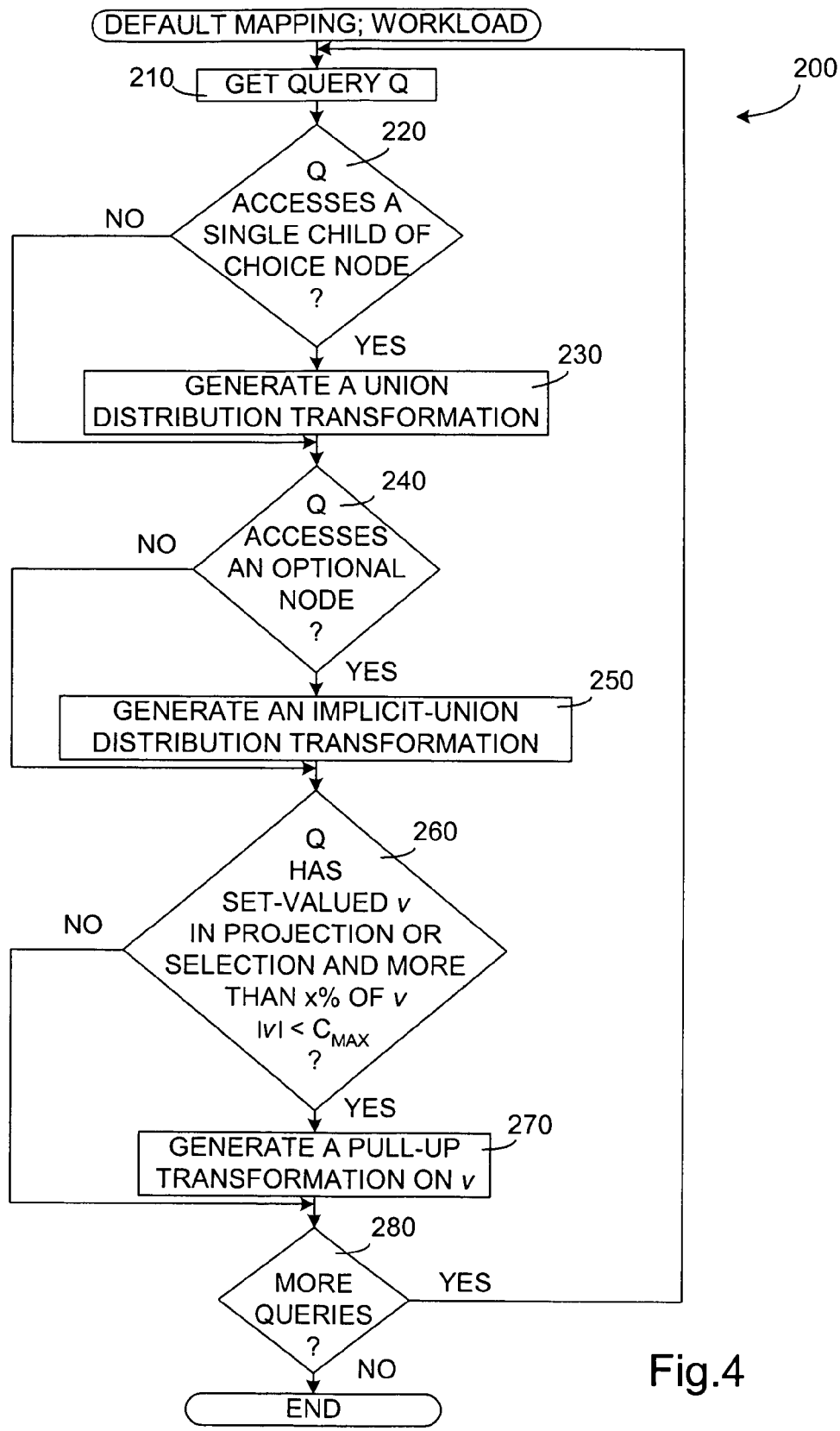
FIG. 4 is a flowchart that illustrates a method for enumerating mapping transformations based on query content and XSD schema according to an embodiment of the present invention.

FIGS. 3 and 4 illustrate the XML transformation tool 100 and its mapping transformation enumerator 130 that selects mapping transformations based on an input XSD schema using a query analyzer 125 that functions according to the method outlined in FIG. 4. The query analyzer 125 examines each XPath query in the workload and enumerates mapping transformations on the default mapping that may improve performance of that query. These transformations take advantage of the XSD specific constraints and statistics of XML data such that they may improve query performance in presence of physical design structures. The query analyzer 125 outputs candidate transformations to a candidate merger 135 that merges candidates such that performance of multiple queries may be improved. The merged candidates are then passed to a design tuner 150 which searches the joint space of logical and physical design. The design tuner 150 iteratively evaluates the candidate mappings and physical design structures against the workload. The design tuner 150 calls an cost estimator 145 to estimate a cost for the enumerated mapping. The cost estimator 145 in turn calls a database physical design tool 140 to select the physical design for each enumerated mapping that optimizes the execution time of a set of SQL queries under the enumerated mapping. These SQL queries are translated from the XPath queries in the workload by a SQL translator 170 based on the enumerated mapping (different mappings may lead to different translated SQL). The physical design tool also returns an estimated cost to execute translated SQL queries in a relational database implementing the mapping and selected physical design structures. Finally, the design tuner 150 selects the mapping and physical design structures with the minimal cost.

For this embodiment, the query optimizer's cost model is used by the physical design tool 140 rather than real execution time because it is inefficient to load the data into databases for each enumerated mapping and run the queries. The physical design tool 140 needs statistics on shredded relations and columns to propose the proper physical design structures and estimate the query execution time. Rather than collecting statistics directly on XML data and then inferring relational statistics, a random sample of the XML documents 110 is loaded into the default RDB mapping 120. The database server's statistics collection facility 122 is used to collect statistics about the default mapping and the default statistics are used to infer statistics for other mappings.

The mapping transformation enumerator 130, design tuner 150, and cost estimator 145 employ several optimization techniques that exploit the properties of mapping transformations and their interplay with physical design. For example, the query analyzer 125 limits the number of mapping transformations by analyzing the query format. Candidate merging is used to avoid over-fitting individual queries by generating candidate transformations that may improve the performance of multiple queries. Since there are many possible transformations generated by merging, a cost-based search algorithm is used to select such transformations. The design tuner uses a greedy search algorithm to search the space of logical design. Finally, query costs are often derived using costs that were obtained under previously enumerated mappings rather than calling physical design tool for every enumerated mapping.

The following pseudo code describes the whole process to search the logical and physical design space.
Input: An XSD schema T, and XML query workload W, a space limit S.
Output: The mapping $M_{min}$ and physical design $F_{min}$ with the minimal cost.

```
(01) M_o = M_min = GenDefaultMapping(T)
(02) C_o = GenCandidate(T,W)
(03) C = MergeCandidate(T,W, C_o)
(04) W_SQL = TranslateToSQL(T, M_o, W)
(05) (cost_min, F_min) = PhysDesignTool( W_SQL, M_o, S)
(06) while C ≠ 0 do
(07)    updated = false
(08)    for each c ∈ C do
(09)       M = Apply Transformation (M_o,c)
(10)       W_SQL = TranslateToSQL(T,M,W)
(11)       (cost, F) = PhysDesignTool(W_SQL,M,S)
(12)       if cost < cost_min then
(13)          (cost_min, F_min) = (cost, F)
(14)          M_min = M; c_min = c; updated = true
(15)       endif
(16)    endfor
(17)    if updated is false then break
(18)    else M_o = M_min; C = C - { c_min } endif
(19) endwhile
(20) return M_min, F_min
```

The algorithm starts with the default mapping $M_O$ generated at line 1 as the initial mapping. After candidate selection and candidate merging (lines 2 and 3) a set of candidate transformations are selected in C. At line 5 the algorithm calls the physical design tool to select physical design structures on $M_O$ using the SQL workload $W_{SQL}$ translated from W at line 4. Lines 6 to 19 repeatedly select the mapping $M_{min}$ that is transformed from the current mapping $M_O$ with one transformation in C and reduces the cost the most. In each round, the minimal cost mapping $M_{min}$ is initialized as $M_O$. For each transformation c ∈ C, lines 8 to 16 enumerate a mapping M transformed from $M_O$ using c (line 9) and call the physical design tool to return the cost and physical configuration of M (lines 10 and 11). Lines 12 to 15 replace $M_{min}$ with M if the cost of M is lower than the cost of $M_{min}$. At the end of the round, line 17 returns if no better mapping is found. Otherwise, line 18 replaces $M_O$ with $M_{min}$, deletes from C the transformation $c_{min}$ that generates $M_{min}$, and proceeds to the next round.

The query analyzer 125 selects mapping transformations based on the default mapping and the XPath® query workload according to the method 200 outlined in FIG. 4. A new query Q in W is analyzed at 210 and the query analyzer transforms the query according to the following rules. If the query Q accesses a single child of a choice node, a union distribution transformation is generated at 220 and 230. If Q accesses an optional node, an implicit union distribution transformation is generated at 240 and 250. If the query Q refers to a set-valued element v in a projection or selection path and v's maximal cardinality is less than a threshold $c_{max}$, or more than x % (x=80 in one embodiment of the invention) of v have a cardinality less than $c_{max}$ a pull-up for the set-valued element v is generated (260-270). The transformations continue for each query in the workload until the supply of queries is exhausted (280).

Because the candidate enumeration performed by the query analyzer is on a per-query basis, it may miss implicit union distributions transformations that may benefit multiple queries. Therefore, the mapping transformation enumerator 130 employs a candidate merger 135 that enumerates "merged" candidates that are useful to multiple queries in the workload. For example, assuming that the year element is also optional in the movie schema shown in FIG. 1, the following two queries are considered.

Q3: //movie{/year}
Q4: //movie{avg_rating}

Q3 returns year element of movies. Q4 returns avg_rating elements of movies. Let $c_1$ and $c_2$ be implicit union distributions on year and avg_rating, respectively. $c_1$ creates two tables, one stores those movies with year elements, and the other stores those movies without year elements. Thus Q3 only needs to access the first partition. However, those movies with avg_rating elements may or may not have year elements. Thus Q4 must access both partitions, and $c_1$ does not improve the performance of Q4. Similarly, $c_2$ helps Q4 but not Q3.

A transformation $c_3$ which splits the movie relation into two partitions, one storing the movies having either year or avg_rating, the other storing the rest of movies. $c_3$ is not selected by candidate selection, but it improves the performance of both queries. $c_3$ can be seen as the result of merging $c_1$ and $c_2$.

If $C_O$ is the set of implicit union distribution candidates selected after candidate selection, then there may be up to $2^{|C_O|}$ possible merged transformations. Thus a cost-based greedy algorithm is used to generate merged candidates. The algorithm merges all pairs $c_i$, $c_j \in C_O$ if they are on the same relation, and the set of optional nodes of $c_i$ is not a subset of that of $c_j$ or vice versa. The merged candidate c is on the union of the optional nodes of C and input $C_O$, and the algorithm deletes from $C_O$ the original candidates used to generate $c_{min}$. This process is repeated until no new candidate is added, and the set of newly created merged candidates are added to original set of candidates.

A heuristic cost model is used to estimate the cost of a merged candidate rather than calling the physical design tool. The performance saving of a candidate is computed rather than its cost because choosing the candidate with minimal cost is identical to choosing the candidate with maximal performance saving. The cost model only considers I/O savings and assumes the cost of the query equals to the sum of the sizes of the relations it access. Given that $c_i$ is an implicit union on relation R, if query Q access multiple partitions generated by $c_i$, the saving is zero. Otherwise, if $R_1$ is the only partition that Q accesses, and RS(Q) is the set of relations referred by Q and cost (Q) is the cost of Q under the default mapping, the I/O savings of $c_i$ over query Q is: cos t($c_i$, Q)=((|R|−|$R_1$|)/$\Sigma_{R' \in RS(Q)}$|R'|·cos t(Q)) where |R| and |$R_1$| denote the sizes of the relations. Hence the total savings of $c_i$ over W is defined as $\Sigma_{Q \in W} s(c_i,Q)f_Q$, which is the weighted sum of savings over each query.

The cost estimator 145 calls the physical design tool 140 to select the physical design for each enumerated mapping and to estimate the cost of executing SQL queries translated from the XPath workload in the relational database that implements the mapping and physical design. Since the physical design tool is called for each enumerated mapping, it accounts for most of the running time of the XML transformation tool. This time can be reduced by using the cost estimator 145 to derive the cost of queries under a new mapping from the cost under previously enumerated mappings rather than calling the physical design tool every time. The basis for this approach is that a transformation only changes one or two relations, thus it is likely that the cost of many queries are not affected.

I(Q,M) is the set of relational objects (indexes, materialized views, relations, and partitions) the query engine uses to answer a query Q under mapping M and cost(Q,M) is the cost of running Q under mapping M. It is assumed that if for a new mapping M', I(Q,M')=I(Q,M) then cost(Q,M')=cost (Q,M) because if the same set of relational objects is used to answer the query, the query optimizer most likely uses the same query plan. Given that M' is transformed from M using transformation c, the following heuristic rules are used to decide when I(Q,M')=I(Q,M).

The irrelevant relation rule holds that if RS(Q) is the set of relations referred by Q, and if c does not change any relation in RS(Q) then I(Q,M')=I(Q,M).

The pull-up rule holds that, given $R \in RS(Q)$, and the plan under M accesses a covering index I on R but not the base relation R. If c pulls up an element v to R, and v is not referred to by Q, then I(Q,M')=I(Q,M). The underlying reasoning for the pull-up rule can be explained by the following example relating to a query Q5:

//movie [year >="1998"] {/title}{/box_office}. A default mapping $M_O$ is considered and a mapping $M_1$ where aka_title is pulled up as illustrated in the example for pull up mapping above. If a covering index $I_1$ on year, title, and box_office is recommended for both mappings, then the index has the same size under both mappings because the movie relations in both mappings have the same number of tuples and the indexed columns are not affected by pull-up. Thus I(Q, Mo)=I(Q, $M_1$).

The union distribution rule holds that if c is a union distribution or implicit union distribution on $R \in RS(Q)$, then I(Q,M')=I(Q,M) for either of the following two cases (1) Q refers to all partitions generated by c, but none of the partitions participates in joins; or (2) R is pulled up in M. The basis for the union distribution rule can be explained by the following example based on the query//movie {/title} and a mapping $M_2$ transformed from the default mapping by union distribution on box_office and seasons as shown in the example for union distribution above. The query and relation satisfy the first condition of the union distribution rule because the query accesses both relations movie1 and movie2, and there is no join. The query plan selects the title on both relations and concatenates the results. Since the results for each relation are already in memory and there is no need for duplicate removal, concatenation has very low cost.

The second condition for the union distribution rule is satisfied if movie has been pulled up. The movie relation is almost empty because most movie elements are stored in the parent relation. Thus applying union distribution on movie does not affect the performance because the cost associated with the movie relation is negligible.

The method used for cost derivation by the cost estimator 145 can be summarized as follows. Given a new mapping M', it is assumed for query $Q_i \in W' \subseteq W$, a mapping $M_i$ has been enumerated and $I(Q_i, M')=I(Q_i, M_i)$. It is further assumed that the physical design tool returns the indexes and materialized views in $I(Q_i, M_i)$ and their sizes. The cost of queries under M' is approximated as follows. For all $Q_i \in W'$, it is assumed that the physical design tool recommends exactly the same physical design structures in $I(Q_i, M_i)$, thus $cost(Q_i,M')=cost(Q_i, M_i)$ where cost $(Q_i, M_i)$ has been computed. For all $Q_j \in W-W'$, it is assumed that the physical design tool recommends exactly the same physical design structures as when the tool is called with workload W-W' and with a new space limit S' equal to old limit S minus the sizes of indexes and materialized view in $\cup_{Q_i \in W'} I(Q_i, M_i)$.

For example, consider a workload consisting of Q5 above and the following query Q6://movie [year="1997"] {/aka_title}{/title}. If the space limit is 2 GB and the default mapping Mo has a tool-recommended covering index I1 for Q5 with size 100 MB and two indexes 12, 13 are recommended for Q6 for a total of 200 MB. For new mapping $M_1$, where aka_title is pulled up, $I(Q5, M_1)=I(Q5, M_O)$ by the pull-up rule. The $cost(Q6, M_1)$ is re-estimated by calling the physical design tool with space limit 1.9 GB (2 GB minus the size of I1) and workload {Q6}. In one embodiment, cost-derivation is used for computing the costs of enumerated mappings from the tuner 150 and the cost of the minimum cost mapping is estimated by calling the physical design tool without derivation to ensure accuracy.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disc drive 30 for reading from or writing to a removable optical disc 31 such as a CD ROM or other optical media. Hard disk drive 27, magnetic disk drive 28, and optical disc drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disc 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disc 31, ROM 24 or RAM 25, including an operating system 35, one or more application programs 36, other program modules 37, and program data 38. A database system 55 may also be stored on the hard disk, magnetic disk 29, optical disc 31, ROM 24 or RAM 25. A user may enter commands and information into personal computer 20 through input devices such as a keyboard 40 and pointing device 42. Other input devices may include a microphone, stylus, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other mechanism for establishing communication over a wide area network 52, such as the Internet. Modem 54, which may be internal or external, is connected to system bus 23 via serial port interface 46 or a broadband connection. In a networked environment, program modules depicted relative to personal computer 20, or portions thereof, may be stored in remote memory storage device 50. It will be appreciated that the network connections shown are exemplary and other mechanisms for establishing a communications link between the computers may be used.

It can be seen from the foregoing description, by transforming a default relational database schema mapped from XML based on XPath queries while considering the impact of physical design structures an optimal relational database can be constructed for population by the shredded XML data. Although the present invention has been described with a degree of particularity, it is the intent that the invention include all modifications and alterations from the disclosed design falling within the spirit or scope of the appended claims.

We claim:

1. A system for constructing a relational database with associated physical structures for storing XML data wherein the XML data has a corresponding XSD schema and a workload comprising queries that have been executed on the XML data comprising:
   a mapping transformation enumerator that examines queries in the workload and generates candidate mapping transformations based on the queries wherein each candidate mapping transformation can be used to transform a default mapping to a candidate mapping from the XSD schema to a relational database schema and wherein each candidate transformation is added to a candidate pool;
   a physical design tool that associates a set of physical design structures with a candidate mapping based on queries in the workload; and
   a design tuner that searches candidate mappings and associated physical design structures and selects a preferred mapping and associated physical design structure,
   wherein the examined query includes one of:
      accessing a single child of choice node in the XSD schema, the mapping transformation enumerator enumerating a union distribution transformation on the accessed node;
      accessing an optional node in the XSD schema, the mapping transformation enumerator enumerating an implicit union distribution transformation on the accessed node; and
      referring to a set-valued element in the XSD schema, the mapping transformation enumerator enumerating a pull-up transformation for the set-valued element.

2. The system of claim 1 comprising a default mapping construction tool that performs a hybrid inlining mapping on the XSD schema to construct the default mapping.

3. The system of claim 1 wherein the examined query accesses a single child of choice node in the XSD schema and wherein the mapping transformation enumerator enumerates a union distribution transformation on the accessed node.

4. The system of claim 1 wherein the examined query accesses an optional node in the XSD schema and wherein the mapping transformation enumerator enumerates an implicit union distribution transformation on the accessed node.

5. The system of claim 1 wherein the examined query refers to a set-valued element in the XSD schema and wherein the mapping transformation enumerator enumerates a pull-up transformation for the set-valued element.

6. The system of claim 5 wherein the mapping transformation enumerator generates a pull-up for the set valued element if the set-valued element has a maximum cardinality of less than a threshold cardinality.

7. The system of claim 5 wherein the mapping transformation enumerator generates a pull-up for the set valued element if more than a threshold number of the set-valued elements have a cardinality of less than a threshold cardinality the set-valued element has a maximum cardinality.

8. The system of claim 1 further comprising a candidate transformation merger that merges candidate transformations in the candidate pool to form a merged candidate transformation.

9. The system of claim 8 wherein the candidate merger merges candidates having optional nodes that were created using an implicit union distribution and wherein the candidates are merged on their optional nodes.

10. The system of claim 1 wherein the design tuner enumerates mappings generated from the default mapping by applying a sequence of candidate transformations to the default mapping.

11. The system of claim 1 wherein the design tuner selects a preferred mapping and associated physical design structures by calling a cost estimator to estimate a cost to execute queries in the workload on a relational database resulting from the mapping in the presence of the associated physical design structures and selects the mapping and physical design structures with the lowest cost.

12. The system of claim 11 wherein the design tuner estimates cost by deriving an estimated cost from a known cost for another mapping.

13. The system of claim 1 wherein the physical design tool associates physical design structures with a candidate mapping by building a relational database schema using the candidate mapping and selecting physical design structures based on relational database queries corresponding to queries in the workload.

14. The system of claim 13 comprising a set of statistical information about the XML database that is accessed by the physical design tool to select physical design structures to associate with a candidate mapping.

15. The system of claim 13 wherein the set of statistical information is compiled by populating a relational database created by applying the default mapping to the XSD schema with sample data from the XML data.

16. A method that constructs a relational database with associated physical structures for storing XML data having an associated XSD schema and a workload made up of queries that have been executed on the XML data comprising:
   examining queries in the workload to generate candidate mapping transformations based on the queries wherein a candidate mapping transformation can be used to transform a default mapping to a candidate mapping from the XSD schema to a relational database schema and wherein each candidate transformation is added to a candidate pool;
   associating a set of physical database design structures with each candidate transformation based on the workload;
   searching candidate mappings and associated physical database design structures and selecting a preferred mapping and associated physical design structure; and
   at least one of:
      selecting a mapping and associated physical design structures from among the enumerated mappings based on the performance of a relational database implementing the mapping and associated physical design structure with respect to the workload;
      constructing the default mapping by transforming the XSD schema using a hybrid inlining mapping;
      merging candidate mapping transformations to form merged candidate mapping transformations.

17. The method of claim 16 comprising selecting a mapping and associated physical design structures from among the enumerated mappings based on the performance of a relational database implementing the mapping and associated physical design structure with respect to the workload.

18. The method of claim 16 comprising constructing the default mapping by transforming the XSD schema using a hybrid inlining mapping.

19. The method of claim 16 wherein if the examined query accesses a single child of a choice node in the XSD schema, a mapping transformation is selected that transforms the given mapping using a union distribution on the accessed node.

20. The method of claim 16 wherein if the examined query accesses an optional node in the XSD schema a mapping transformation is selected that transforms the given mapping using an implicit union distribution on the accessed node.

21. The method of claim 16 wherein if the examined query refers to a set-valued element in the XSD schema a mapping transformation is selected that transforms the given mapping by generating a pull-up for the set-valued element.

22. The method of claim 21 wherein the mapping transformation that generates a pull-up for the set valued element is selected if the set-valued element has a maximum cardinality of less than a threshold cardinality.

23. The method of claim 21 wherein the mapping transformation that generates a pull-up for the set valued element is selected if more than a threshold number of the set-valued elements have a cardinality of less than a threshold cardinality.

24. The method of claim 16 comprising merging candidate mapping transformations to form merged candidate mapping transformations.

25. The method of claim 24 wherein candidates that have optional nodes that were created using an implicit union distribution are merged and wherein the candidates are merged on their optional nodes.

26. The method of claim 16 wherein the preferred mapping is selected by estimating a cost to execute queries in the workload in a relational database implementing the mapping and the associated physical design structures and selecting the mapping and physical design structures with the lowest cost.

27. The method of claim 26 wherein the cost is estimated by deriving an estimated cost from a known cost for another mapping.

28. Computer readable media having computer-executable instructions stored thereon for constructing a relational database with associated physical structures for storing XML data having a corresponding XSD schema and a workload comprising queries that have been executed on the XML data, the instructions comprising:
examining a queries in the workload and generating candidate mapping transformations based on queries in the workload wherein a candidate mapping transformation can be used to generate mappings from XSD to a relational database schema and wherein each candidate transformation is added to a candidate pool comprising a set of candidate transformations; and
searching mappings generated from transforming a default mapping using candidate transformations in the candidate pool together with physical design structures associated with those mappings and selecting a preferred mapping and associated physical design structures,
wherein the examined query comprises at least one of:
accessing a single child of a choice node in the XSD schema, the instructions comprising transforming the given mapping using a union distribution on the accessed node;
accessing an optional node in the XSD schema, the instructions comprising transforming the given mapping using an implicit union distribution on the accessed node;
referring to a set-valued element in the XSD schema, the instructions comprising transforming the given mapping by generating a pull-up for the set-valued element.

29. The computer readable media of claim 28 wherein the instructions comprise transforming the XSD schema to a relational database schema using a default mapping protocol so that the default mapping is transformed based on the query.

30. The computer readable media of claim 28 wherein the examined query accesses a single child of a choice node in the XSD schema and wherein the instructions comprise transforming the given mapping using a union distribution on the accessed node.

31. The computer readable media of claim 28 wherein the examined query accesses an optional node in the XSD schema and wherein instructions comprise transforming the given mapping using an implicit union distribution on the accessed node.

32. The computer readable media of claim 28 wherein the examined query refers to a set-valued element in the XSD schema and wherein the instructions comprise transforming the given mapping by generating a pull-up for the set-valued element.

33. The computer readable media of claim 28 wherein the instructions comprise merging candidate mapping transformations in the candidate pool to form a merged candidate mapping transformation.

34. The computer readable media of claim 33 wherein candidates having optional nodes that were created using an implicit union distribution are merged and wherein the candidates are merged on their optional nodes.

35. The computer readable media of claim 28 wherein the instructions comprise enumerating mappings generated from the default mapping by applying sequence of transformations in the candidate pool to the default mapping, associating physical design structures with each such mapping, and selecting a preferred mapping based on the mapping and associated physical design structures.

36. The computer readable media of claim 35 wherein instruction comprise selecting a preferred mapping with its associated physical design structures by estimating a cost to execute queries in the workload in a relational database implementing the mapping and physical design structures and selecting the mapping and associated physical design structures with the lowest cost.

37. The computer readable media of claim 36 wherein the cost is estimated by deriving an estimated cost from a known cost for another mapping.

* * * * *